(No Model.)

T. R. CRANE.
FERTILIZER DISTRIBUTER.

No. 487,719. Patented Dec. 13, 1892.

Witnesses:
J. C. Mattoon.
F. Parker Davis.

Inventor:
Thomas R. Crane,
By Chas. B. Mann
Attorney.

UNITED STATES PATENT OFFICE.

THOMAS R. CRANE, OF HEATHSVILLE, VIRGINIA.

FERTILIZER-DISTRIBUTER.

SPECIFICATION forming part of Letters Patent No. 487,719, dated December 13, 1892.

Application filed March 4, 1892. Serial No. 423,716. (No model.)

*To all whom it may concern:*

Be it known that I, THOMAS R. CRANE, a citizen of the United States, residing at Heathsville, in the county of Northumberland and State of Virginia, have invented certain new and useful Improvements in Fertilizer-Distributers, of which the following is a specification.

This invention relates to improvements in fertilizer-distributers for agricultural machines, and has for its object to provide an arrangement whereby fertilizer containing hard lumps will be thoroughly ground and pulverized before reaching the discharge-openings in the hopper-box.

A further object is to provide means for preventing said discharge-openings becoming closed by fertilizer sticking therein.

With these ends in view the invention consists in the novel features of construction and combinations of parts hereinafter described and claimed.

The invention is illustrated in the accompanying drawings, in which—

Figure 1:
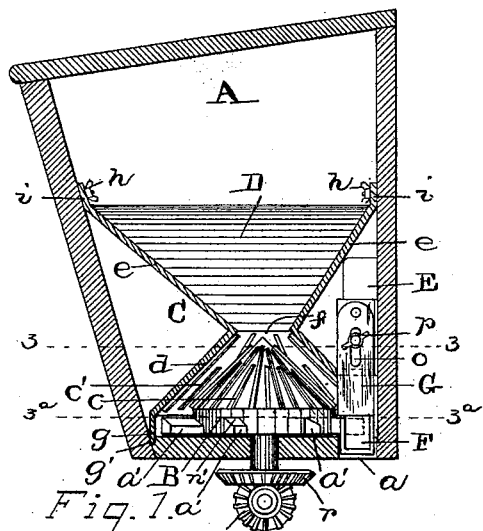
Figure 2:
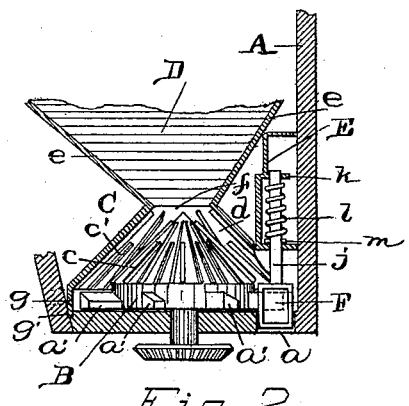
Figure 3:
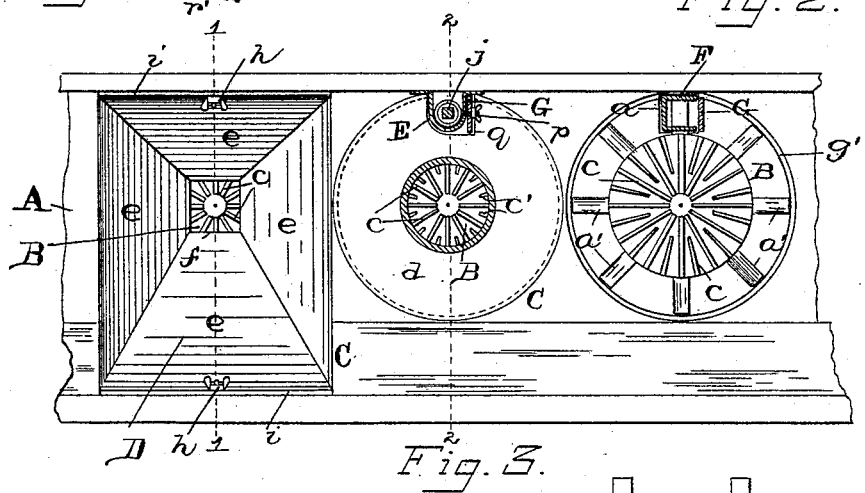
Figure 4:
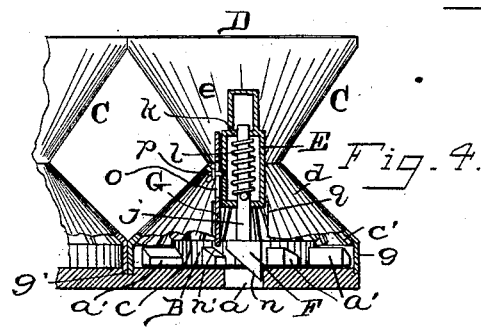
Figure 5:
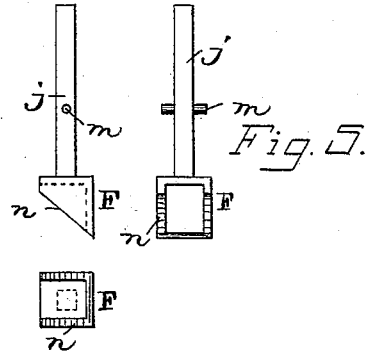

Figure 1 shows a cross-section of the hopper-box on the line 1 1 of Fig. 3. Fig. 2 shows a similar cross-section on the line 2 2 of Fig. 3. Fig. 3 shows a top view of a portion of a hopper-box, showing three adjacent distributers located therein. One part of the view shows the hopper of the distributer in plan. The next part shows the mechanism inside the hopper-box on the section-line 3 3 of Fig. 1, and the remaining part shows the hopper-shell removed and a plan of the revolving head with a section of the plunger and cut-off plate, taken on line $3^a$ $3^a$ of Fig. 1. Fig. 4 shows a section view taken on the line 4 4 of Fig. 3, the hopper-shells appearing in side elevation and broken away at the base. Fig. 5 shows a group of views of a plunger for keeping the discharge-opening clear.

The letter A designates the hopper-box, which will be suitably located on a machine and provided with a row of discharge-openings $a$ in its bottom. A stirrer-head B works over the bottom of the hopper-box adjacent to each of said openings and has radiating arms $a'$, which travel over the discharge-opening and carry the fertilizer thereto. The head B is made cone-shaped and provided with ribs $c$, extending from the apex downward.

A shell C is fitted in the box over this cone-shaped head B and is made conical to conform thereto, as seen at $d$, which conical part is provided with ribs $c'$, opposing those on the cone B. The shell contracts over the apex of the cone, and above this point comprises a hopper D, with inclined sides $e$, sloping down to the small opening $f$ over the apex of the cone. The shell is held in place by having flanges $g$, which fit in grooves $g'$ in the bottom of the hopper-box, and by thumb-screws $h$, passing through flanges $i$ of the shell at the top part thereof into the sides of said hopper-box.

Fastened to the side of the hopper-box and above the discharge-opening $a'$ is a casing E, and a plunger F has a stem $j$, which engages through a hole in the bottom of said case and also through a guide-piece $k$ inside the case. A spiral spring $l$ surrounds the stem inside the case and bears at one end against a pin $m$ in the stem and at the other end against said guide-piece. This spring tends to hold the plunger down. Said plunger is in the form of a box with three sides and the top closed and the remaining side and bottom open. It is beveled on the under side, as shown at $n$, and its lowest part normally occupies the discharge-opening $a$. The upper sides of the stirrer-arms $a'$ are beveled, as at $n'$, and it will be seen that as said arms revolve their beveled sides engage the beveled under side of the plunger and push the latter up out of their path and pass on. As the arms leave the plunger the spring $l$ throws the latter down into the opening $a$, and thus any fertilizer lodging therein will be pushed out and the said opening will always be kept clear.

The arms $a'$ carry the fertilizer around to the discharge-opening, through which it drops, and the supply to said opening may be regulated by means of a cut-off plate G, fitting against the side of the case E and having a vertical slot $o$, through which a thumb-screw $p$ passes into the said case. The said plate may be adjusted to cut off the desired amount and locked by means of the thumb-screw.

When fertilizer of such a nature as to require grinding before feeding to the discharge-opening is used, the shell C will be fitted in the hopper-box, said shell having an opening

*q*, so that it may receive the case E. The fertilizer placed in the hopper D works down around the cone B and is ground and pulverized by the action of the ribs *c c'*, so that when it reaches the stirrer-arms it is in condition to discharge through the opening *a*. The cones are revolved by means of any suitable mechanism, such as the gear *r r'*. (Shown in the drawings.)

When fertilizer not requiring grinding is used, the shells C may be readily taken out to give more space.

Having thus described my invention, what I claim as new, and desire to secure by Letters Patent, is—

1. The combination of the hopper-box having a discharge-opening in its bottom, a revoluble cone-shaped head working over said bottom and having radial stirrer-arms to pass over said openings, and a shell comprising a conical part to fit over the cone-shaped head, and a hopper above the same, said conical part and the cone-shaped head having ribs, substantially as described.

2. The combination of the hopper-box having a discharge-opening in its bottom, a revoluble head working over said bottom and having radial arms to pass over said discharge-opening, a vertically-sliding plunger located at the discharge-opening and engaging in the same and having a stem which fits through a suitable guide, said plunger arranged to be moved upward and out of the said opening by the radial arms on the revolving head, and a spring on the plunger-stem to return said plunger into the discharge-opening after a radial arm has passed, in the manner and for the purpose described.

3. The combination of the hopper-box having a discharge-opening in its bottom, a revoluble cone-shaped head working over said bottom and having radial arms to pass over said discharge-opening, said arms beveled on the upper side, a case secured to the side of the box, a plunger having a stem to slide through said case, said plunger engaging in the discharge-opening and having a beveled under side for contact with the radial stirrer-arms, a spring on the plunger-stem to hold the plunger down, and a vertically-adjustable cut-off plate on the exterior of the plunger-case.

In testimony whereof I affix my signature in the presence of two witnesses.

THOMAS R. CRANE.

Witnesses:
 JNO. T. MADDOX,
 F. PARKER DAVIS.